United States Patent [19]

Wisniewski

[11] Patent Number: 5,408,728
[45] Date of Patent: Apr. 25, 1995

[54] EYEGLASS HOLDER

[76] Inventor: Ronald Wisniewski, 2605 Bauernschmidt Dr., Baltimore, Md. 21221

[21] Appl. No.: 935,304

[22] Filed: Aug. 24, 1992

[51] Int. Cl.⁶ ............................................. A44B 21/00
[52] U.S. Cl. ........................................ 24/3.3; 24/336
[58] Field of Search ................ 24/3 R, 3 C, 3 E, 3 F, 24/3 G, 3 L, 336, 555, 563, 531

[56] References Cited

U.S. PATENT DOCUMENTS

| | | | |
|---|---|---|---|
| 606,082 | 6/1898 | Pilkington | 24/36 X |
| 2,493,503 | 1/1950 | Renne | 24/555 |
| 3,798,712 | 3/1974 | Bonis | 24/36 |
| 4,949,432 | 8/1990 | Wizniewski | 24/3 E X |

FOREIGN PATENT DOCUMENTS 265672  3/1950  Switzerland ................ 24/555

Primary Examiner—James R. Brittain
Attorney, Agent, or Firm—Walter G. Finch

[57] ABSTRACT

An improved holder to be securely and removably attached to a garment, and for holding a pair of eyeglasses, by securely and removably attaching to the temple bars of the eyeglasses. The holder includes a body formed of resilient material that effectively forms a substantially U-shaped center body with two adjoining transverse substantially U-shaped clips, comprising four relatively planar and concentric legs, wherein two of the legs extend in transverse and opposite substantially U-shaped directions from adjacent ends of one of the two legs that form the substantially U-shaped center body to form the two adjoining clips. The substantially U-shaped center body eliminates the need for additional lining material that prior inventions require to accommodate a wide range of temple bars having varying shapes and sizes.

2 Claims, 3 Drawing Sheets

EYEGLASS HOLDER

This invention relates to improvements in detachable eyeglass holders and more particularly to holders for use on temple bars of eyeglasses. Prior art eyeglass holders require different size holders or the addition of a flexible lining material to accommodate the many shapes and sizes of temple bars of eyeglasses. With these prior devices, the lining material many times becomes compressed, distorted and dislodged rendering it ineffective. Additionally, as is the case with prior art eyeglass holders, when holding a pair of eyeglasses on a garment hem, the eyeglasses hang on the outside of the garment. Thus the temple bar of the eyeglasses that is not attached to the device tends to fall open.

In the field of eyeglass holders, there is a need for a simple rugged eyeglass holder, that can be quickly and easily attached to and separated from the eyeglass temple and/or similar object, i.e. one that positively holds a pair of eyeglasses with temple bars without the need for additional lining material or the manufacture of different size holders to accommodate the varying sizes and shapes of temple bars.

Prior disclosure relating to this field of the prior art include the following U.S. Pat. Nos. 439,423; 1,322,966; 2,097,371; 2,570,670; 2,670,886; 3,508,691; 4,055,873; 4,055,874; 4,458,384; 4,949,432; and Fed. Rep. of Germany Pat. No. 2,728,906.

The above mentioned prior art holders are more or less lacking in the ability to adequately satisfy all of the needs as aforestated.

It is an object of this invention to provide a holder adapted to be securely and removably attached to portions of garments such as for example a shirt pocket, or coat lapel, or similar object, and for holding a pair of eyeglasses of a character having temple bars of varying sizes and shapes, without the need for lining material or different size holders.

A further object of this invention is to provide a holder comprising four relatively concentric planar legs, the two outer legs of which extend in transverse and opposite substantially U-shaped directions from adjacent ends of one of the legs forming a substantially U-shaped center body to provide a garment clip and a transverse and opposite temple bar clip.

Another object of this invention is to provide a holder of the character described having a temple bar clip for attachment to the temple bar of a pair of eyeglasses and which optionally can receive and hold the second temple bar of the pair of eyeglasses.

An additional object of this invention is to provide a holder of the character described having a resilient material or the like between the common leg and the central body leg of the device forming the U-shaped center body, thereby to increase the holding power.

Another object of this invention is to provide a holder clip of the character described wherein at least one of the legs comprising the substantially U-shaped center body is cross sectionally open therethrough, through which protrudes a resilient material between the common leg and the center body leg thereby to increase the holding power of the clip.

Another object of this invention is to provide a new and improved eyeglass holder a common leg thereof is planarly separated between the planar surfaces of the common leg to effectively form two planar common legs abreast one another which are attached at a pivot point allowing the clips thereof to swivel along the planar separation portion thereof.

Still another object of this invention is to provide a low cost machine formed eyeglass holder of the character described, which can be used for a variety of eyeglass temples and garments and other similar objects, and which can be readily fabricated in a variety of different modifications to meet the needed requirements of the eyeglass user.

Other objects and advantages of this intention will become apparent from the following specification, claims and accompanying drawings.

DETAILED DESCRIPTION OF THE DRAWINGS

Figure 1:
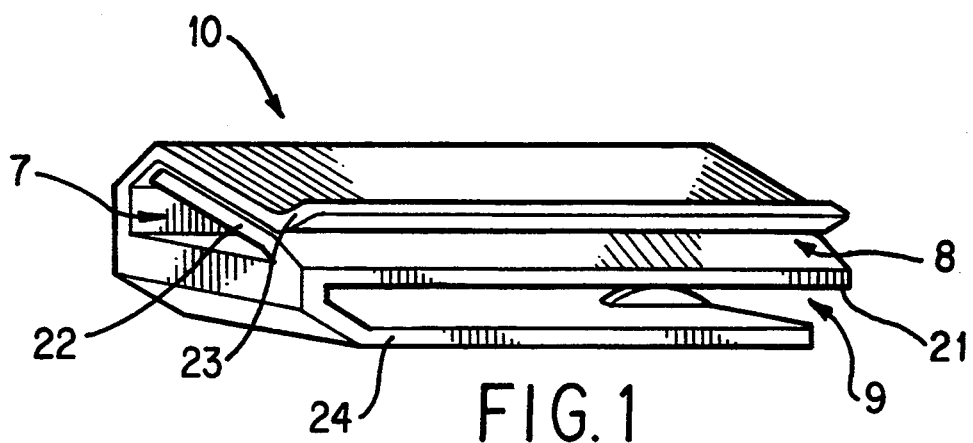
FIG. 1 is an oblique view of a preferred embodiment of the eyeglass holder of the invention.
Figure 2:
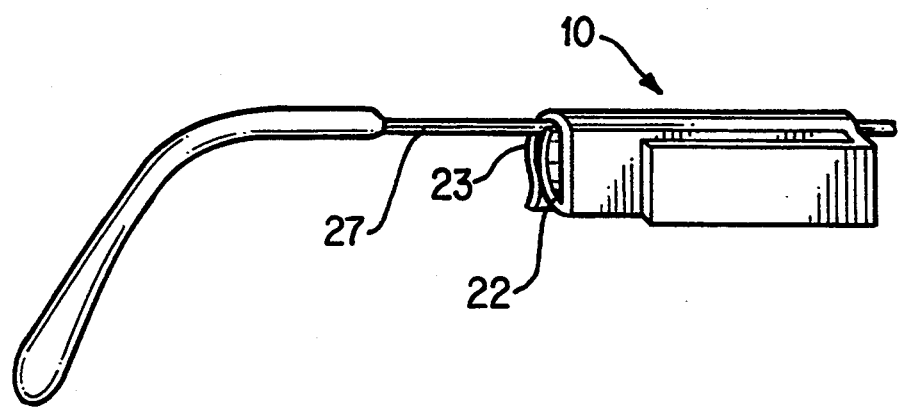
FIG. 2 is an oblique view of the invention showing the manner in which the holder receives and holds a temple bar of a pair of eyeglasses.

In FIG. 1 there is shown the eyeglass holder of the invention comprising a body formed of resilient material broadly designated by the reference character 10. It comprises a common leg 21 from which extends a center body leg 22 in a substantially U-shaped direction relatively concentric and abreast to one face of common leg 21 thereby forming a substantially U-shaped flat hinged shaped center body 7. From the opposite side of the common leg 21 extends a temple bar 23 in a substantially U-shaped direction relatively concentric and abreast the center body leg 22 forming a flat hinged-type temple bar clip 8 to securely and removably attach to an eyeglass temple bar 27 as shown in FIG. 2. Both the temple bar leg 23 and the center body leg 22 flex to adjust to varying size temple bars and exert holding pressure to both sides of the temple bar 27. From an adjacent end of common leg 21 extends a transverse substantially U-shaped flat hinged-type garment clip 9 to securely and removably provide attachment to a garment or other similar object.

Figure 3:
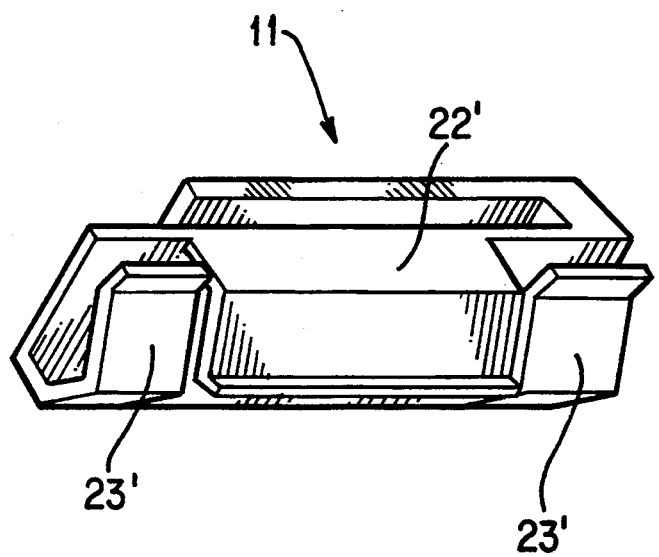
FIG. 3 and FIG. 8 are oblique views of an alternate embodiment of the invention and how the holder receives and holds both temple bars of a pair of eyeglasses.
Figure 8:
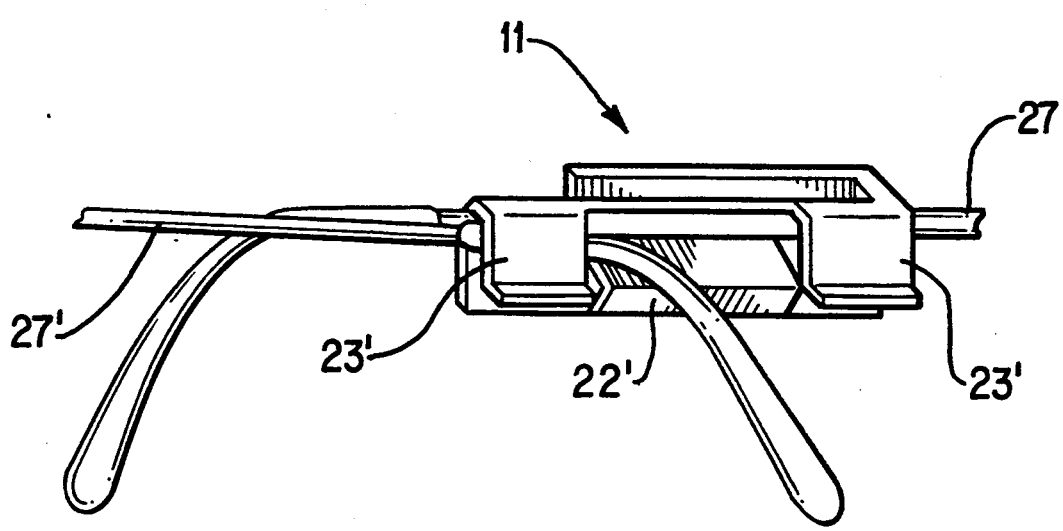

FIG. 3 illustrates an alternate embodiment of the invention in the form of a new holder 11 which is substantially the same as holder 10, except that portions of the center body leg 22 and temple bar leg are deleted to effectively form a center body leg 22' and a temple bar leg 23' that have surfaces not abreast to one another. As shown in FIG. 8 the holder 11 is attached to a temple bar 27 of a pair of eyeglasses and temple bar leg 23' optionally is attached to the outer temple bar leg 23' that have surfaces not abreast to one another. As shown in FIG. 8 the holder 11 is attached to a temple bar 27 of a pair of eyeglasses and temple bar leg 23' optionally is attached to the outer temple bar 27' of the pair of eyeglasses thereby preventing either temple bar from opening.

Figure 4:
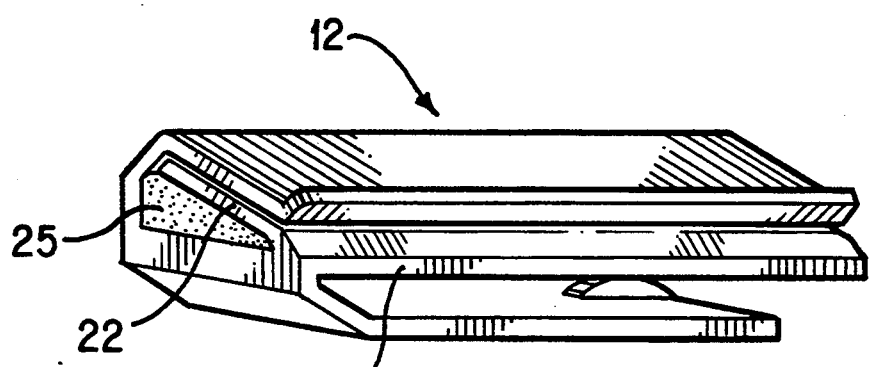
FIG. 4 is an oblique view of another alternate embodiment of the invention.

FIG. 4 illustrates another alternate embodiment of the invention in which the holder 12 is substantially the same as holder 10. It has a resilient material 25 between the common leg 21 and the central leg 22 to increase the holding power thereof.

Figure 5:
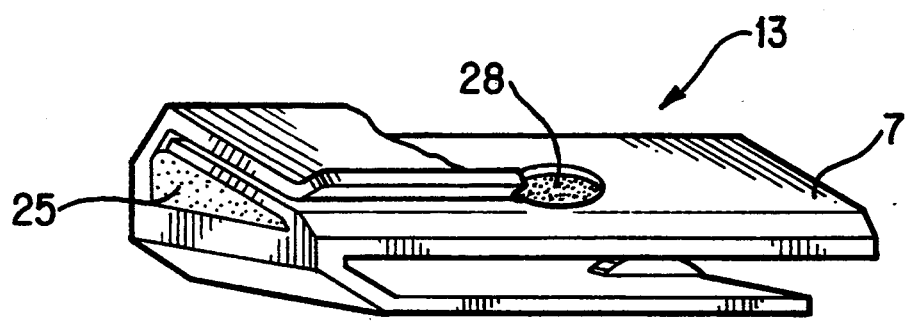
FIG. 5 is an oblique view of yet another alternative embodiment of the eyeglass holder of the invention.

FIG. 5 illustrates another alternate embodiment of the invention in which the holder 13 is substantially the same as holder 10. It has at least one leg comprising the U-shaped center body 7 cross sectionally open 28 there through, through which protrudes resilient material 25 to increase the holding power.

Figure 6:
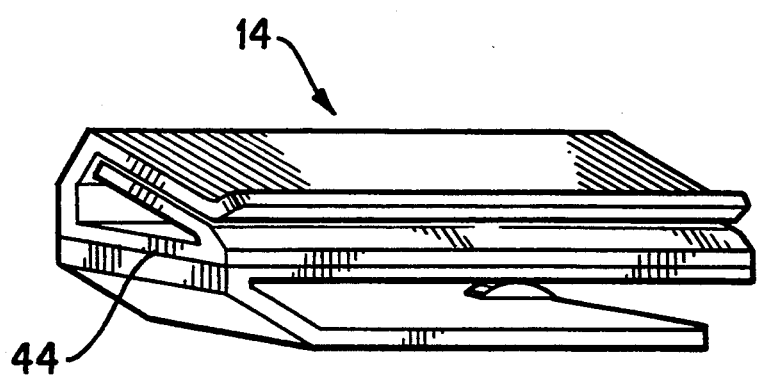
FIG. 6 and FIG. 7 are oblique views of still another alternate embodiment of the invention.
Figure 7:
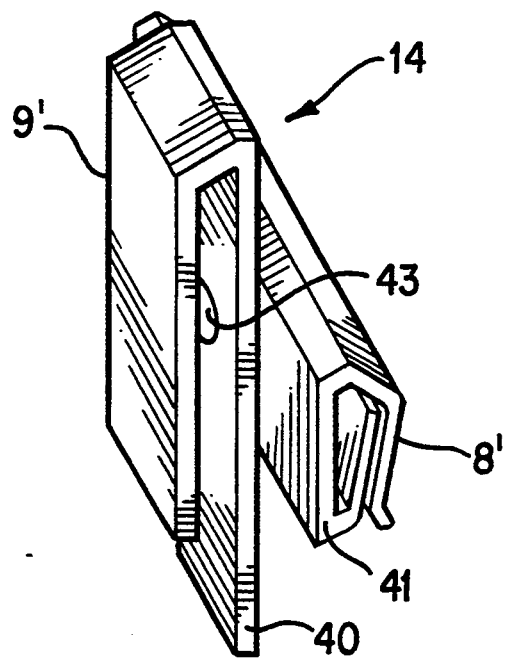

FIG. 6 and FIG. 7 illustrate another alternate embodiment of the invention which the holder 14 is substantially the same as holder 10. It has the common leg planarly separated between the planar surfaces of the common leg to effectively form two relatively flat parallel planar concentric common legs 40 and 1 which are attached at a pivot point 43 thereby allowing the temple bar clip 8' and the garment clip 9' to swivel along the planar separation 44.

It will be apparent from the foregoing that the new dual transversely adjoining relatively flat U-shaped hinged type clips incorporating a substantially shaped flat hinged shaped central body portion have been disclosed, and that such a dual clip lends itself to a variety of applications. The dual clip is easily and removably attached to a wide range of eyeglass temple bars of varying sizes and shapes without additional lining material or the need of the manufacture of the clip in varying sizes. It is easily and removably attached to garments and similar objects to securely hold the eyeglasses when not in use. Having thus described the invention in five embodiments thereof, it is intended to be recognized that departures may be made therefrom without departing from the spirit and scope of the invention.

I claim:

1. A holder for a pair of eyeglasses having temple bars, said holder formed from a body of resilient material, said holder comprising:

a central elongate portion having a front face and a rear face, said central elongate portion having an upper edge, a lower edge, a left edge, and a right edge, said central elongate portion being essentially flat;

a first leg section connected to said central elongate portion along said lower edge of said central elongate portion, said first leg section being essentially flat, said first leg section and said front face of said central elongate portion in an opposed spaced apart relationship, said first leg section extending from said lower edge of said central elongate portion in a plane inclined away from said central elongate portion and terminating in a spaced apart position from said upper edge of said central elongate portion;

a second leg section connected to said central elongate portion along said upper edge of said central elongate portion, said second leg section extending nearly perpendicularly away from said front face of said central elongate portion, said second leg section curving around and enclosing said first leg section, said second leg section having a flat area covering said first leg section in a parallel, spaced apart, face-to-face relationship therewith, said flat area of said second leg section extending in a plane inclined toward said lower edge of said central elongate portion;

a third leg section, said third leg section being essentially flat, said third leg section connected to said central elongate portion along said left edge of said central elongate portion, said third leg section extending along said rear face of said central elongate portion in a parallel, spaced apart, face-to-face relationship therewith, said third leg section terminating near said right edge of said central elongate portion; and a resilient foam material inserted in between said central elongate portion and said first leg section, said resilient foam material improving the holding power of said holder, whereby one of said temple bars of said pair of eyeglasses lodged in between said first leg section and said second leg section receives additional pressure from said resilient foam material.

2. A holder as recited in claim 1, wherein said first leg section has at least one cross sectional opening along its face, and whereby said resilient foam material inserted between said central elongate portion and said first leg section passes through said cross sectional opening in said first leg section and improves the frictional holding power of said holder.

* * * * *